(12) United States Patent
Clark et al.

(10) Patent No.: US 7,349,381 B1
(45) Date of Patent: Mar. 25, 2008

(54) SYNCHRONIZATION TECHNIQUE FOR SPREAD SPECTRUM FREQUENCY HOPPED DATA LINKS AND RADIOS USING THE SAME

(75) Inventors: Stephen M. Clark, Marion, IA (US); Terry J. Golubiewski, Cedar Rapids, IA (US); Scott J. F. Zogg, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/560,381

(22) Filed: Apr. 28, 2000

(51) Int. Cl.
*H04J 3/24* (2006.01)
(52) U.S. Cl. .................................. 370/350; 375/134
(58) Field of Classification Search ............ 370/337, 370/347, 252, 350; 375/132, 134, 137
See application file for complete search history.

(56) References Cited

U.S. PATENT DOCUMENTS

| | | | |
|---|---|---|---|
| 4,267,592 A | 5/1981 | Craiglow | 370/29 |
| 4,937,822 A | 6/1990 | Weddle et al. | 370/124 |
| 4,970,479 A | 11/1990 | Landt et al. | 333/101 |
| 5,204,855 A | 4/1993 | Bebee et al. | 370/50 |
| 5,204,856 A | 4/1993 | Bebee et al. | 370/50 |
| 5,359,595 A | 10/1994 | Weddle et al. | 370/50 |
| 5,428,647 A * | 6/1995 | Rasky et al. | 375/366 |
| 5,521,533 A | 5/1996 | Swanke | 327/107 |
| 5,563,918 A | 10/1996 | Waldschmidt et al. | 375/347 |
| 5,564,097 A | 10/1996 | Swanke | 455/302 |
| 6,490,262 B1 * | 12/2002 | Hogger | 370/337 |

OTHER PUBLICATIONS

Bernard Sklar, "Digital Communications Fundamentals and Applications", 1988, PTR Prentice Hall, pp. 562-570.*
Text book synchronization solutions for synchronization to a FH/DSS data link, "Principles of Secure Communication Systems", pp. 148-173; D.J. Torrieri; Artech House; 1991.
Spread Spectrum Communications Handbook, Ch. 3, pp. 956-991; M. Simon, J. Omura, R. Scholtz and B. Levitt; McGraw-Hill, 1994.

* cited by examiner

*Primary Examiner*—Douglas Olms
*Assistant Examiner*—Robert W. Wilson
(74) *Attorney, Agent, or Firm*—Nathan O. Jensen; Kyle Eppele (57) ABSTRACT

A method of obtaining coarse synchronization in a frequency hopped/direct sequence spread spectrum (FH/DSS) time division multiple access (TDMA) data link network includes tuning the receiver to a first frequency used in the data link network. Then, signal strength of signals received on the first frequency during a sample time period is observed to obtain a sample energy pattern. An expected energy pattern during a time uncertainty window is determined based upon a known hopping pattern. Then, the sample energy pattern is compared to a first portion of the expected energy pattern, with the first portion of the expected energy pattern corresponding to a first time period within the time uncertainty window. A determination is then made as to whether the first time period is a coarse synchronization candidate based upon the comparison. If it is determined that the time period is a coarse synchronization candidate, one or more additional comparisons on different frequencies can be used to verify the hypothesis.

13 Claims, 5 Drawing Sheets

SYNCHRONIZATION TECHNIQUE FOR SPREAD SPECTRUM FREQUENCY HOPPED DATA LINKS AND RADIOS USING THE SAME

GOVERNMENT LICENSE

The U.S. Government has a paid-up license in this invention and the right in limited circumstances to require the patent owner to license others on reasonable terms as provided for by the terms of Grant No. N00014-96-C-0089 awarded by the United States Navy.

FIELD OF THE INVENTION

The present invention relates to frequency hopped (FH) \direct sequence spread spectrum (DSS) time division multiple access (TDMA) data links. More particularly, the present invention relates to a method of performing coarse synchronization in a FH/DSS TDMA data link.

BACKGROUND OF THE INVENTION

Frequency hopped/direct sequence spread spectrum (FH/DSS) time division multiple access (TDMA) data links (hereafter FH/DSS data links) require synchronization to operate correctly. Often, this synchronization is achieved in phases. In each phase a higher level of synchronization is achieved. The lowest level of synchronization, sometimes referred to "coarse synchronization", refers to synchronization on the order of magnitude of one of the TDMA time slots that are shared by all users of the network. The coarse synchronization is typically followed by a fine synchronization stage. Frequently, the time required for coarse synchronization is the major contributor to the total synchronization time.

Coarse synchronization usually requires an initial estimate of time before synchronizing to the correct slot of the network. In currently available FH/DSS data links, time required to acquire coarse synchronization is on the same order of magnitude as the accuracy of the initial time estimate. For example, for an initial time accuracy of one minute σ, a radio would require on the order of one to five minutes to acquire coarse synchronization.

Previously available techniques for obtaining coarse synchronization involved tuning a correlation device for a specific direct sequence patterns and dwelling until a received bit sequence with a high correlation is obtained. This process requires a length of time that is longer than the standard deviation of the initial time uncertainty.

Another available method of obtaining coarse synchronization requires the transmitter to go into a transmit mode in which a trivial signal is transmitted for the purpose of gaining coarse synchronization. This method has the inherent vulnerability of being susceptible to jamming and spoofing, and requires cooperation by the transmitter. Thus, in data link systems operating in certain environments, this can be a highly undesirable solution.

Solutions for synchronization to a FH/DSS data link generally fall into two models, serial-search acquisition and matched-filter acquisition. See for example PRINCIPLES OF SECURE COMMUNICATION SYSTEMS, pp. 148-173 (Artech House 1992) by Don J. Torrieri; and SPREAD SPECTRUM COMMUNICATIONS HANDBOOK, Ch. 3 pp. 956-991 (McGraw-Hill 1994) by Simon et al. which are herein incorporated by reference in their entirety. Serial-search acquisition requires the received signal to be mixed against a local version of the frequency hopping pattern. The down converted signal is then low-pass filtered and integrated for a period. If the received energy exceeds a threshold, synchronization is declared. If not, the local frequency hopping pattern is shifted in time and the process starts over. For modern data links, serial-search acquisition is often too slow. Likewise, matched-filter acquisition as described in the Torrieri reference requires longer than the initial time uncertainty as discussed above.

Consequently, a faster method of performing coarse synchronization in a FH/DSS data link when a user has poor knowledge of time (minutes) is needed.

SUMMARY OF THE INVENTION

A method of obtaining coarse synchronization in a frequency hopped/direct sequence spread spectrum (FH/DSS) time division multiple access (TDMA) data link network includes tuning the receiver to a first frequency used in the data link network. Then, signal strength of signals received on the first frequency during a sample time period is observed to obtain a sample energy pattern. An expected energy pattern during a time uncertainty window is determined based upon a known hopping pattern. Then, the sample energy pattern is compared to a first portion of the expected energy pattern, with the first portion of the expected energy pattern corresponding to a first time period within the time uncertainty window. A determination is then made as to whether the first time period is a coarse synchronization candidate based upon the comparison. If it is determined that the time period is a coarse synchronization candidate, one or more additional comparisons on different frequencies can be used to verify the hypothesis.

DETAILED DESCRIPTION OF AN ILLUSTRATIVE EMBODIMENT

Figure 1:
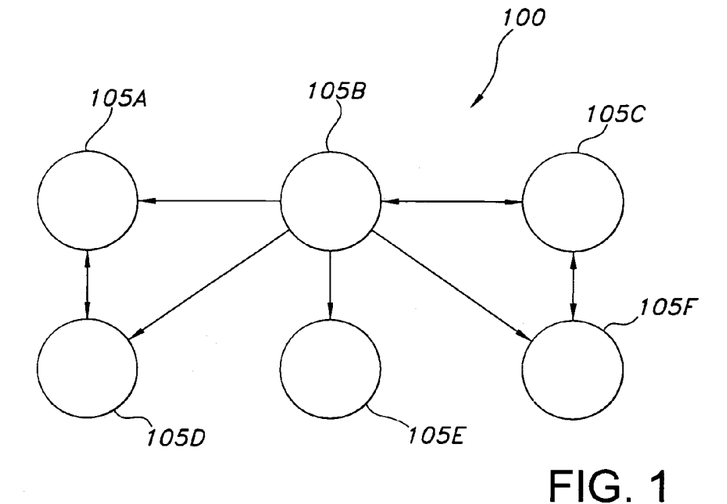
FIG. 1 is a diagrammatic illustration of a FH/DSS data link radio network having radios which obtain coarse synchronization using methods of the present invention.

FIG. 1 is a diagrammatic illustration of a FH/DSS data link or radio network 100. Network 100 includes a multiplicity of radios 105, which are adapted to communicate using FH/DSS TDMA techniques of the type known in the art. The FH/DSS data link radios 105 (radios 105A-105F are shown but more or less can be included) can communicate, using known techniques, with selected ones of the other radios in network 100, or with all of the other radios in network 100. For example, as illustrated in FIG. 1, radio 105A can be set up to transmit messages to and receive messages from radio 105D. As shown, radio 105C is set up to transmit messages to and receive messages from both of radios 105B and 105F. Also, as illustrated, radio 105B can be used in a broadcast mode in which it transmits messages simultaneously to each of radios 105A, 105C, 105D, 105E and 105F. The illustrated configuration of network 100 is provided as an example of an operating environment, and is not intended to limit the invention.

Each of radios 105 in network 100 communicates in a coordinated manner during TDMA time slots over a multiplicity of different frequencies according to a frequency hopping pattern. The frequency hopping pattern used in the system is a pseudo-noise (PN) based sequence, where the PN is dependent upon the system time. In accordance with the present invention, radios 105 are adapted to obtain coarse synchronization by observing a portion of the frequency hopping pattern, and subsequently searching all known hop patterns within a time window to find the one that best correlates. This and other features of the present invention are discussed below.

Figure 2:
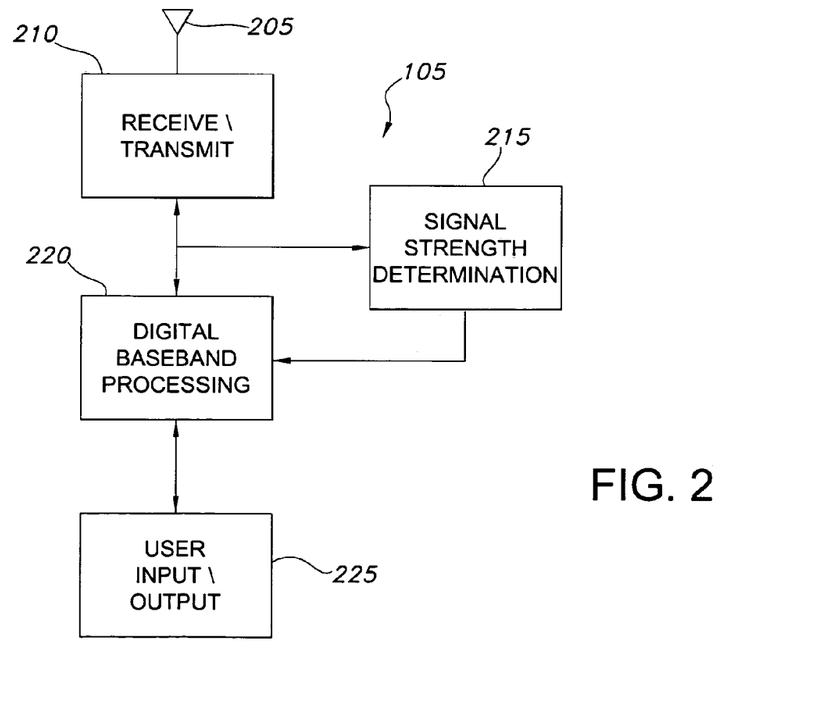
FIG. 2 is a block diagram illustrating a radio which is programmable to obtain coarse synchronization in accordance with the methods of the invention.

FIG. 2 is a block diagram illustrating a typical configuration for each of radios 105 in network 100. The invention is not limited to the particular implementation of radio 105 shown in FIG. 2. In the exemplary embodiment shown in FIG. 2, each radio 105 includes an antenna 205, receive/transmit circuitry 210, signal strength determining circuitry 215, digital baseband processing circuitry 220 and a user input/output (I/O) 225. Antenna 205 and receive/transmit circuitry 210 are used to transmit digital data to other radios within network 100 during TDMA time slots over the multiplicity of frequencies according to a hopping pattern. Digital baseband processing circuitry 220, which is for example a suitably programmed microprocessor or digital signal processor, controls receive/transmit circuitry 210 in order to transmit digital information over the network according to the hopping pattern. Digital base band processing circuitry 220 also processes digital data received by antenna 205 and circuitry 210 from other radios within network 100.

Signal strength determining circuitry 215 can be implemented at least partially within a microprocessor such as the same microprocessor used to implement digital baseband processing circuitry 220. Signal strength determining circuitry 215 is used in accordance with the invention to determine the signal strength of signals received by antenna 205 and circuitry 210. In this manner, radio 105 can observe a portion of the frequency hopping pattern used by the other radios, and then can search all known hop patterns within a time window to find the one that best correlates, thereby providing a mechanism for performing coarse synchronization.

Figure 3A:
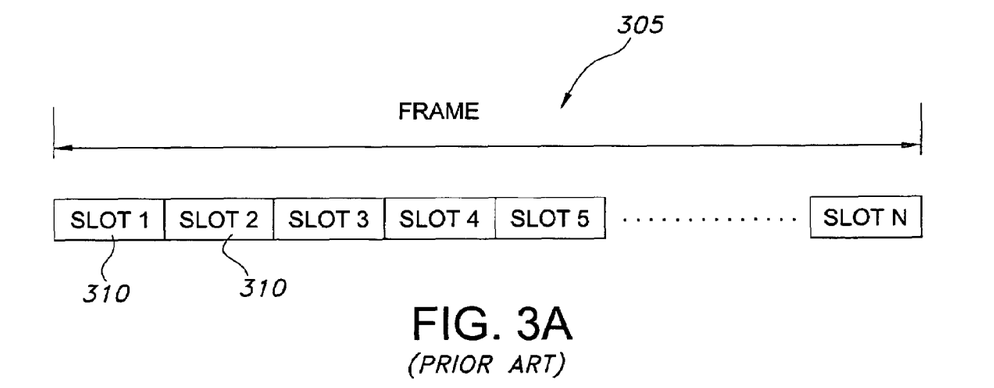
FIGS. 3A and 3B are diagrammatic illustrations of a general format in which TDMA time slots can be organized, both in the prior art and in the present invention.
Figure 3B:
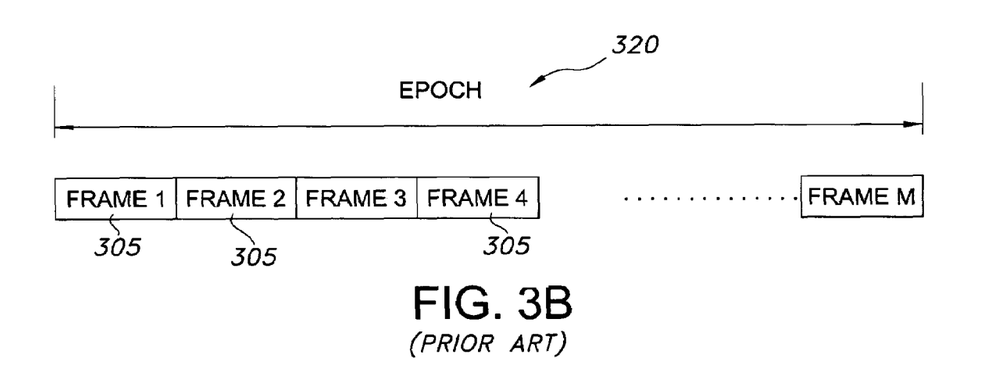

FIGS. 3A and 3B diagrammatically illustrate the general format in which TDMA time slots are organized, both in the prior art and in the present invention. As illustrated in FIG. 3A, in a TDMA frequency hopping communication network, the radios transmit and receive during segmented time periods sometimes referred to as "slots". A multiplicity of slots 310 (N slots are illustrated in FIG. 3A) together form a period of time commonly referred to as a "frame" 305. As shown in FIG. 3B, a multiplicity of frames 305 (M frames are illustrated in FIG. 3B) together form a larger time period known as an "epoch" 320. The present invention includes a method of H performing coarse synchronization to a particular slot 310 in a manner which is orders of magnitude faster than conventional methods.

As discussed above, if the frequency hopping pattern used in the network is a PN based sequence, where the PN is dependent on the system time and therefore on the particular time slots, synchronization can be obtained by observing a portion of a frequency hopping pattern, and then searching all known hop patterns within a time window to find the one that best correlates. The time window in which all known hopping patterns are searched includes multiple time slots, and for example, could be on the order of 0.25 seconds in length. With the methods of the present invention which implement the search process faster, the result is a coarse synchronization with the transmitter after only a very brief search. Typically, the search requires a time which is much less than the duration of the time uncertainty window. The time uncertainty window represents a time quantity that the radio clock is estimated to be off by as compared to the time used by other radios in the network. In an exemplary embodiment, the time uncertainty window can be on the order of about one second or more. Generally, using the methods of the present invention, coarse synchronization times can be improved by one to two orders of magnitude.

Figure 4A:
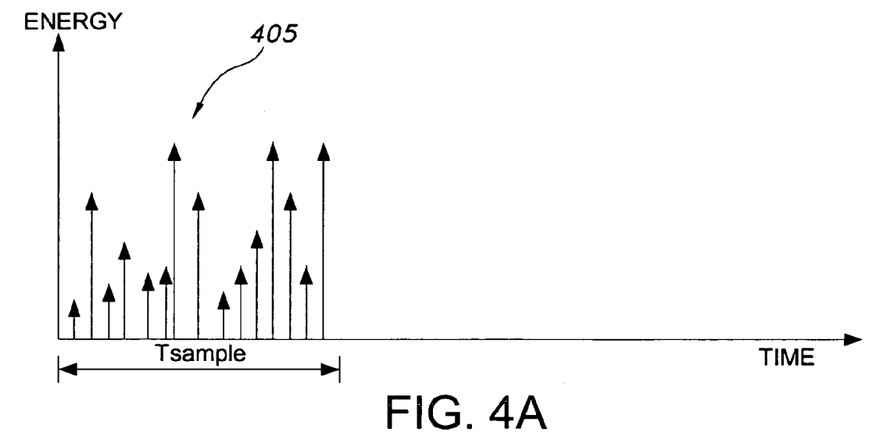
FIGS. 4A-4C are plots illustrating steps used to obtain a sample pattern on a frequency in the FH/DSS data link radio network.

Aspects of the coarse synchronization technique of the present invention can be described as follows. Ideally, the method of the present invention operates under the assumption that the frequency-hopping pattern is a PN sequence, where each frequency is picked with an approximately equal probability of occurrence. The first step in the process of obtaining coarse synchronization is to tune the receiver (e.g., antenna 205 and circuitry 210) of a radio 105 to a fixed frequency and to observe the received signal strength (energy) versus time over some period. Thus, signal strength determination circuitry 215 is utilized at this point of the process. During this time, samples of the power received on the tuned frequency are collected. FIG. 4A illustrates a sample 405 of the collected power received on the tuned frequency over a sample period of time $T_{SAMPLE}$.

Figure 4B:
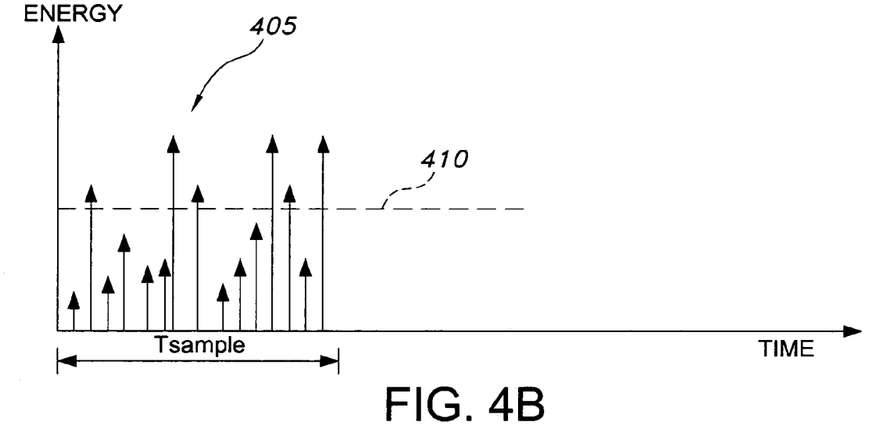
Figure 4C:
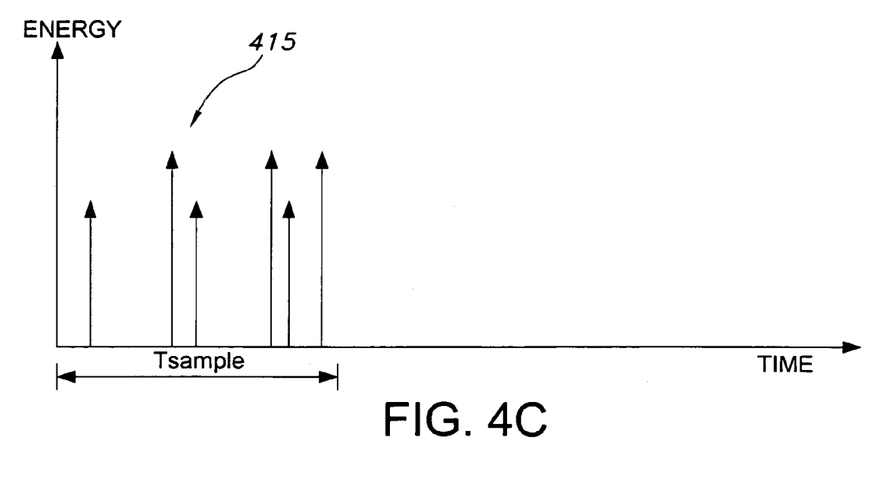

After collecting sample 405, a processing element (e.g., digital base band processing circuitry 220) computes a threshold value 410 that statistically only a fraction of the samples exceed. This is illustrated in FIG. 4B. The result is a sample 415 of received energy during the sample time period $T_{SAMPLE}$ which is more clearly representative of transmissions on the network, and which is less effected by noise. This is illustrated in FIG. 4C.

Figure 5:
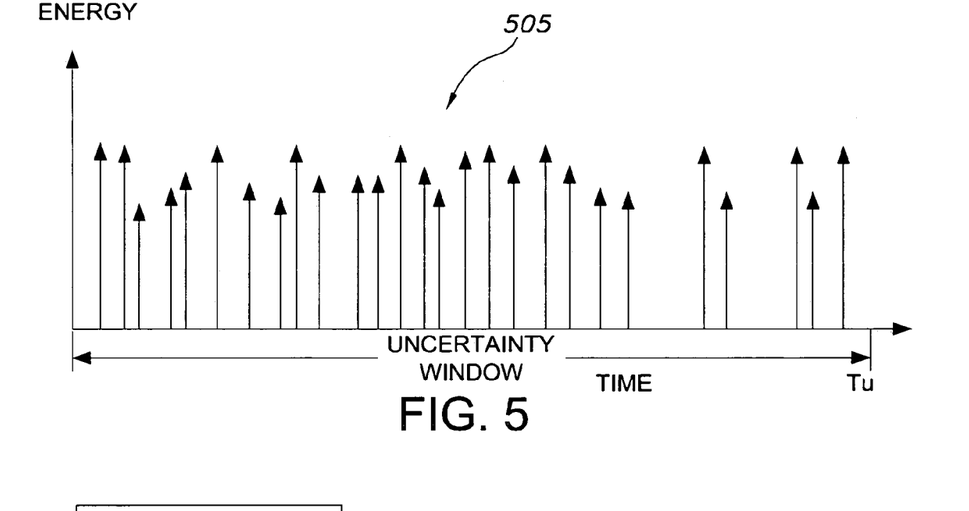
FIG. 5 is a plot illustrating an expected pattern corresponding to a time uncertainty window which is determined based upon a known hopping pattern.

After applying threshold 410 to the energy received on the tuned frequency during the sample period $T_{SAMPLE}$ to obtain energy sample 415, the processor element tries to correlate the received energy versus time with known hopping patterns for each slot in the uncertainty window until a correlation is found. An exemplary expected energy pattern 505, for a known hopping pattern corresponding to the time uncertainty window, is illustrated in FIG. 5. The pattern shown in FIG. 5 is for illustrative purposes only, and is not necessarily indicative of an expected energy pattern during an uncertainty window using actual hopping patterns. Likewise, FIGS. 4A-4C and 6A-6C are illustrative, but not intended to limit the invention.

Correlation of the received energy versus time with the known hopping patterns for each slot in the uncertainty window is done by first assuming a start time and computing the hop pattern for that time. For example, in FIG. 6A hop pattern 605 for an initial start time is shown between dashed lines 606 and 607. At all the positions in the computed hop pattern 605 where the received frequency was tuned, the received energy in sample 415 is compared to the expected hop pattern 605.

Figure 6A:
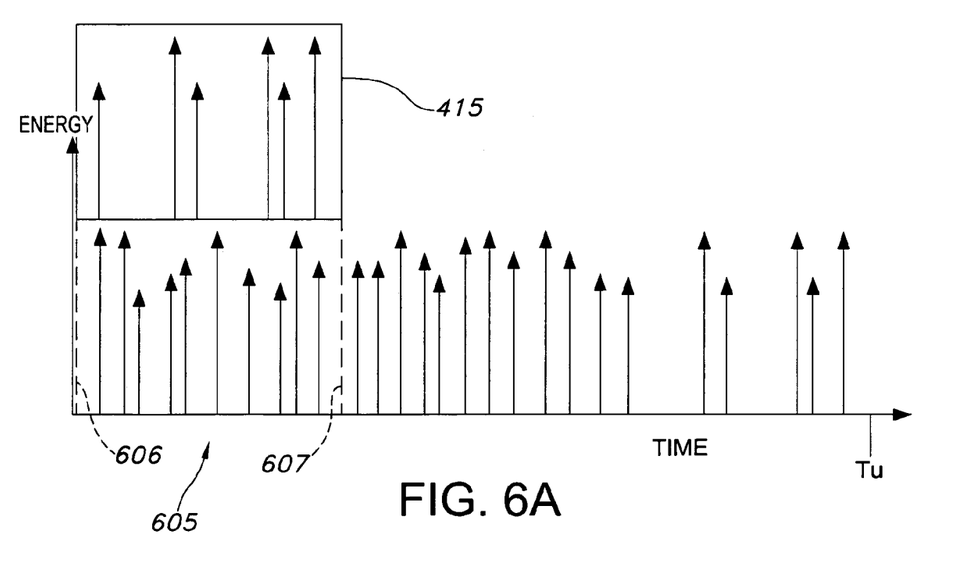
FIGS. 6A-6C are plots illustrating comparisons, of the sample pattern against portions of the expected pattern, which can be used to identify coarse synchronization time candidates.

If the energy in the received pattern 415 is higher than threshold 410 (FIG. 4B) at each expected time in hop pattern 605 (i.e., if sample pattern 415 matches expected hop pattern 605), the corresponding initial time assumption is noted as a possibility for the coarse synchronization time. If the energy level in received pattern 415 does not exceed threshold 410 at each of the expected times (i.e., if pattern 415 does not match expected pattern 605), then the hopping pattern is shifted ahead by one sample time, and is again compared to check for a correlation. This is shown for example in FIG. 6B in which the expected energy hopping pattern 610 for a second time is computed.

Figure 6B:
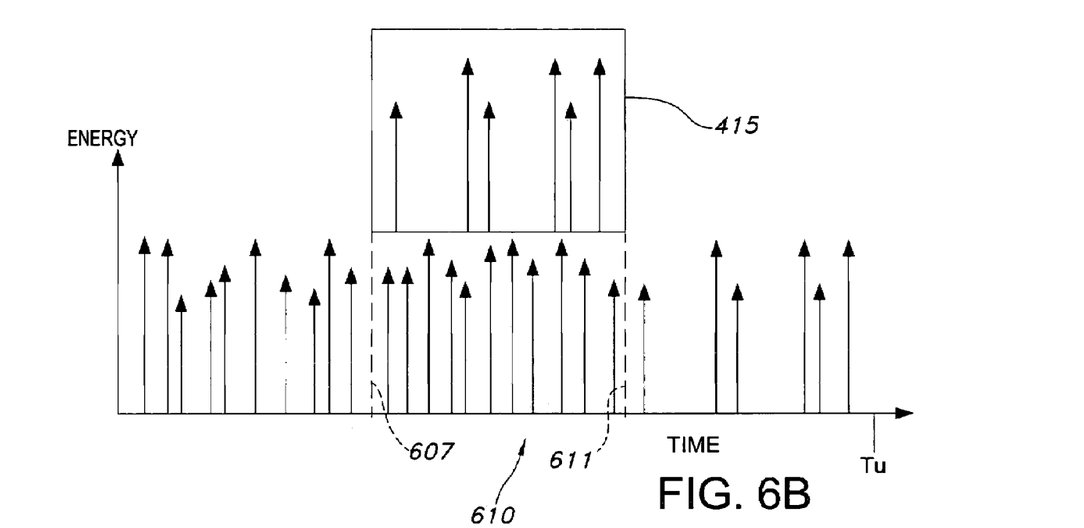
Figure 6C:
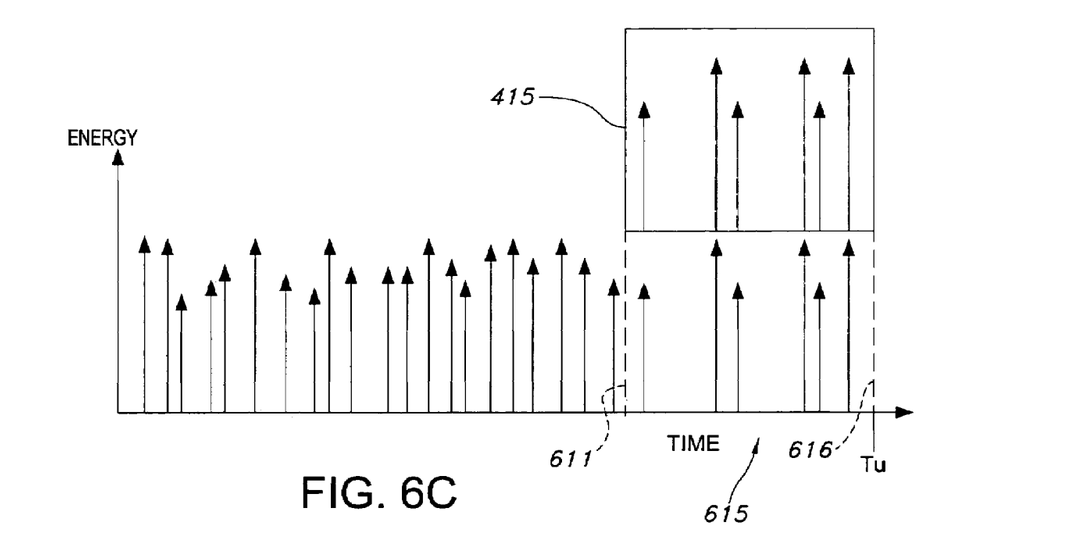

Expected energy hopping pattern 610 is shown between dashed lines 607 and 611. Received energy pattern 415 is compared to expected hopping pattern 610 to identify a possible energy correlation. This correlation process is repeated over the entire window of time uncertainty until a match or high correlation is found. For example, FIG. 6C illustrates expected energy hopping pattern 615, between dashed lines 611 and 616, for a third period of time. As can be seen in FIG. 6C, received energy pattern 415 matches expected energy hopping pattern 615, indicating that this third time period is a good candidate for coarse synchronization. If no correlation is found, the procedure is repeated on another frequency.

After finding a potential correlation, a number of test correlations may be performed on another frequency, where a block of samples are taken and the pattern is compared to the appropriate hopping pattern for the new coarse synchronization time hypothesis. If the new block of samples on a different frequency also correlates the time is used as the coarse synchronization time. This verification process is beneficial in some embodiments because, in a jammed environment, a pulsed jammer or other jammer can cause a number of time hypotheses to pass the initial criteria. However, false hypotheses may be statistically disproved very quickly.

This coarse synchronization process may be further refined by first examining all channels (frequencies), and only using those channels whose background energy is lowest. This helps the desired transmit pulses to appear above the noise in a partial band jammed environment.

An illustration of the decreased coarse synchronization time which can be achieved using the invention is provided as follows. To estimate the capabilities of current technologies for performing the computations described above, an assumption can be made that there is a single transmitter in the network transmitting in sixteen known slots per second. Each transmission can be assumed to be on 258 different frequencies, randomly chosen from the available frequencies for the network. Tuning to a particular frequency for a one second interval, that frequency can be expected to be visited on average about 81 times. If the time uncertainty window were for example 60 seconds long, and if the samples had a length of about 13 microseconds, there would be 4,615,384 possible alignments of the received one second period with respect to the 60 second uncertainly window. Using a 200 MHz TMS320C6201 DSP, the received data can be compared for correlation against each of the possible alignments in less than one second. If the threshold is set so that 80% of the samples pass the threshold, the probability of a noise source causing a correlation is less than one in sixteen for the entire uncertainty window. This is a low enough probability to allow investigation of every correlation that is found using the method described above. Through this process, synchronization can be gained in less than two seconds, whereas using conventional synchronization techniques the assumed sixty second uncertainty window would have required on the order of sixty seconds to achieve coarse synchronization. For larger time uncertainties, the synchronization time reduction is an even greater multiple.

In another embodiment, each of multiple receivers 105 is tuned to a different frequency and is used to obtain a different sample pattern during the sample time period. The process described above is then used to compare each of the sample energy patterns from the different operational frequencies to the expected energy patterns on those frequencies (as determined using the hopping pattern). This provides additional information, and among other benefits, may eliminate the need for further verification of a synchronization candidate.

Although the present invention has been described with reference to illustrative embodiments, workers skilled in the art will recognize that changes may be made in form and detail without departing from the spirit and scope of the invention.

What is claimed is:

1. A method of obtaining coarse synchronization in a frequency hopped/direct sequence spread spectrum (FH/DSS) time division multiple access (TDMA) data link network, the method comprising:
   tuning a first receiver to a fixed first frequency out of a plurality of frequencies used in the data link network;
   observing signal strength of signals received on the fixed first frequency during a sample time period;
   collecting samples during the sample time period over a plurality of samples on the fixed first frequency to obtain a sample energy pattern;
   applying a threshold to the sample energy pattern;
   obtaining a received energy pattern by utilizing a fraction of energy components in the sample energy pattern that exceed the threshold;
   determining an expected energy pattern on the fixed first frequency corresponding to a time uncertainty window, the expected energy pattern being based upon a known hopping pattern;
   comparing the received energy pattern to a first portion of the expected energy pattern on the fixed first frequency, the first portion of the expected energy pattern corresponding to a first time period within the time uncertainty window; and
   determining whether the first time period is a coarse synchronization candidate as a function of the comparison between the received energy pattern and the first portion of the expected energy pattern.

2. The method of claim 1, wherein the first time period corresponds to a first plurality of time slots used in the data link network and which fall within the time uncertainty window, and wherein determining the expected energy pattern further comprises determining the first portion of the expected energy pattern based upon an expected hopping pattern for the first plurality of time slots.

3. The method of claim 2, wherein the sample period has a duration which is substantially equal to the first time period which falls within the time uncertainty window.

4. The method of claim 1, wherein determining whether the first time period is a coarse synchronization candidate further comprises determining whether the received energy pattern and the first portion of the expected energy pattern are substantially a match.

5. The method of claim 1, and if the first time period is determined to not be a coarse synchronization candidate, then further comprising:
   comparing the received energy pattern to a next portion of the expected energy pattern, the next portion of the expected energy pattern corresponding to a next time period within the time uncertainty window; and
   determining whether the next time period is a coarse synchronization candidate as a function of the comparison between the received energy pattern and the next portion of the expected energy pattern.

6. The method of claim 5, and further comprising sequentially repeating, for subsequent time periods within the time uncertainty window until a coarse synchronization candidate is found, the step of comparing the received energy pattern to the next portion of the expected energy pattern, and the step of determining whether the next time period is a coarse synchronization candidate as a function of the comparison.

7. The method of claim 6, and after a coarse synchronization candidate is found, then further comprising:
   tuning the first receiver to a fixed second frequency out of the plurality of frequencies used in the data link network;
   observing signal strength of signals received on the fixed second frequency during a second sample time period;
   collecting samples during the second sample time period over a plurality of samples on the fixed second frequency to obtain a second sample energy pattern;
   applying a threshold to the second sample energy pattern;
   obtaining a second received energy pattern by utilizing a fraction of energy components in the second sample energy pattern that exceed the threshold;
   determining a second expected energy pattern during a time period corresponding to the second sample time period, using the coarse synchronization candidate as a reference time, based upon the known hopping pattern;
   comparing the second received energy pattern to the second expected energy pattern corresponding to the second sample time period; and
   verifying the accuracy of the coarse synchronization candidate based upon the comparison between the second received energy pattern and the expected energy pattern.

8. The method of claim 1, and further comprising:
   tuning each of a plurality of other receivers to different one of a plurality of other fixed frequencies used in the data link network;
   observing signal strength of signals received on each of the plurality of other fixed frequencies during the sample time period;
   collecting samples during the sample time period over a plurality of samples on the plurality of fixed frequencies to obtain a plurality of other sample energy patterns;
   applying the threshold to the plurality of other sample energy patterns;
   obtaining a plurality of other received energy Patterns by utilizing a fraction of energy components from the plurality of sample energy patterns that exceed the threshold;
   determining a plurality of other expected energy patterns corresponding to the time uncertainty window, each of the plurality of other expected energy patterns being based upon a known hopping pattern and upon a corresponding one of the plurality of other fixed frequencies;
   comparing each of the plurality of other received energy patterns to a first portion of the corresponding one of the plurality of other expected energy patterns, the first portion of each of the plurality of other expected energy patterns corresponding to a time period within the time uncertainty window; and
   determining whether the time period within the time uncertainty window is a coarse synchronization candidate as a function of the comparisons.

9. A radio for use in a frequency hopped/direct sequence spread spectrum (FH/DSS) time division multiple access (TDMA) data link network, the radio comprising:
   a first receiver adapted to be tuned to a fixed first frequency out of a plurality of frequencies used in the data link network;
   signal strength determining circuitry adapted to observe signal strength of signals received on the fixed first frequency during a sample time period;
   processing circuitry coupled to the signal strength determining circuitry and adapted to determine a sample energy pattern on the fixed first frequency in response to the observations by the signal strength determining circuitry, the processing circuitry being further adapted to apply a threshold to the sample energy pattern to and to determine a received energy pattern by utilizing energy components in the sample energy pattern that exceed the threshold, the processing circuitry being further adapted to determine an expected energy pattern corresponding to a time uncertainty window, the expected energy pattern being based upon a known hopping pattern, the processing circuitry being adapted to compare the received energy pattern to a first portion of the expected energy pattern, the first portion of the expected energy pattern corresponding to a first time period within the time uncertainty window, the processing circuitry further being adapted to determine as a function of the comparison whether the first time period is a coarse synchronization candidate.

10. The radio of claim 9, wherein the first time period correspond to a first plurality of time slots used in the data link network and which fall within the time uncertainty window.

11. The radio of claim 10, wherein the sample period has a duration which is substantially equal to the first time period.

12. The radio of claim 9, wherein if the first time period is determined to not be a synchronization candidate, then the processing circuitry is further adapted to compare the received energy pattern to a next portion of the expected energy pattern, the next portion of the expected energy pattern corresponding to a next time period within the time uncertainty window, and wherein the processing circuitry is adapted to determine whether the next time period is a coarse synchronization candidate as function of the comparison between the received energy pattern and the next portion of expected energy pattern.

13. An apparatus for obtaining coarse synchronization in a frequency hopped/direct sequence spread spectrum (FH/DSS) time division multiple access (TDMA) data link network, the apparatus comprising:
   means for tuning a first receiver to a fixed first frequency out of a plurality of frequencies used in the data link network;

means for observing signal strength of signals received on the fixed first frequency during a sample time period to obtain a sample energy pattern;

the means for applying a threshold to the sample energy pattern and to determine a received energy pattern by utilizing energy components from the sample energy pattern that exceed the threshold;

means for determining an expected energy pattern on the fixed first frequency corresponding to a time uncertainty window, the expected energy pattern being based upon a known hopping pattern;

means for comparing the received energy pattern to a first portion of the expected energy pattern, the first portion of the expected energy pattern corresponding to a first time period within the time uncertainty window; and means for determining whether the first time period is a coarse synchronization candidate as a function of the comparison between the received energy pattern and the first portion of the expected energy pattern.

\* \* \* \* \*